March 17, 1953 H. C. HOLLINGER 2,631,444
OVERLOAD CLUTCH
Filed Aug. 7, 1947 2 SHEETS—SHEET 1
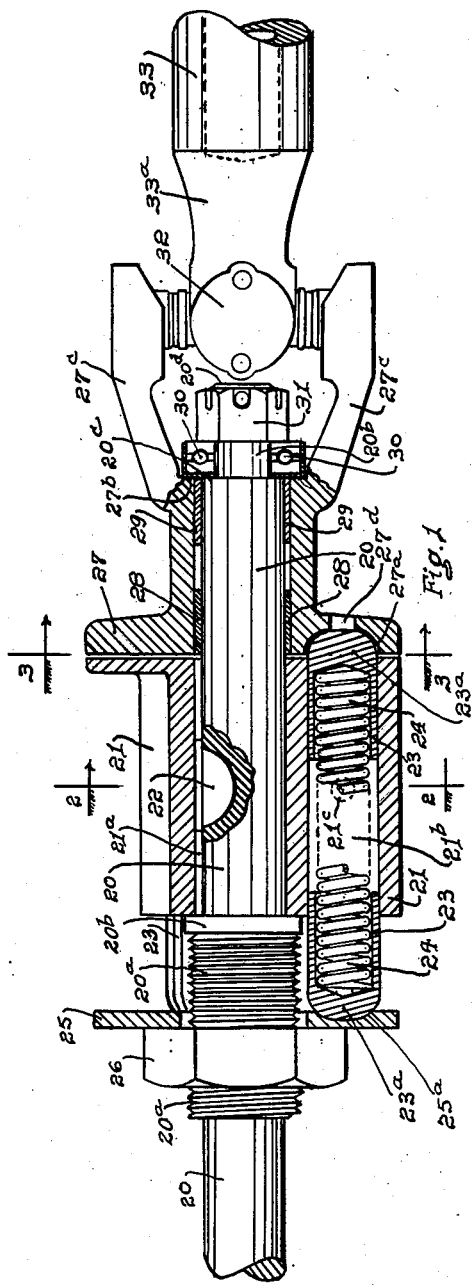
Inventor
*Harry C. Hollinger*
By *Walter W. Burns*
Attorney March 17, 1953     H. C. HOLLINGER     2,631,444
OVERLOAD CLUTCH
Filed Aug. 7, 1947     2 SHEETS—SHEET 2
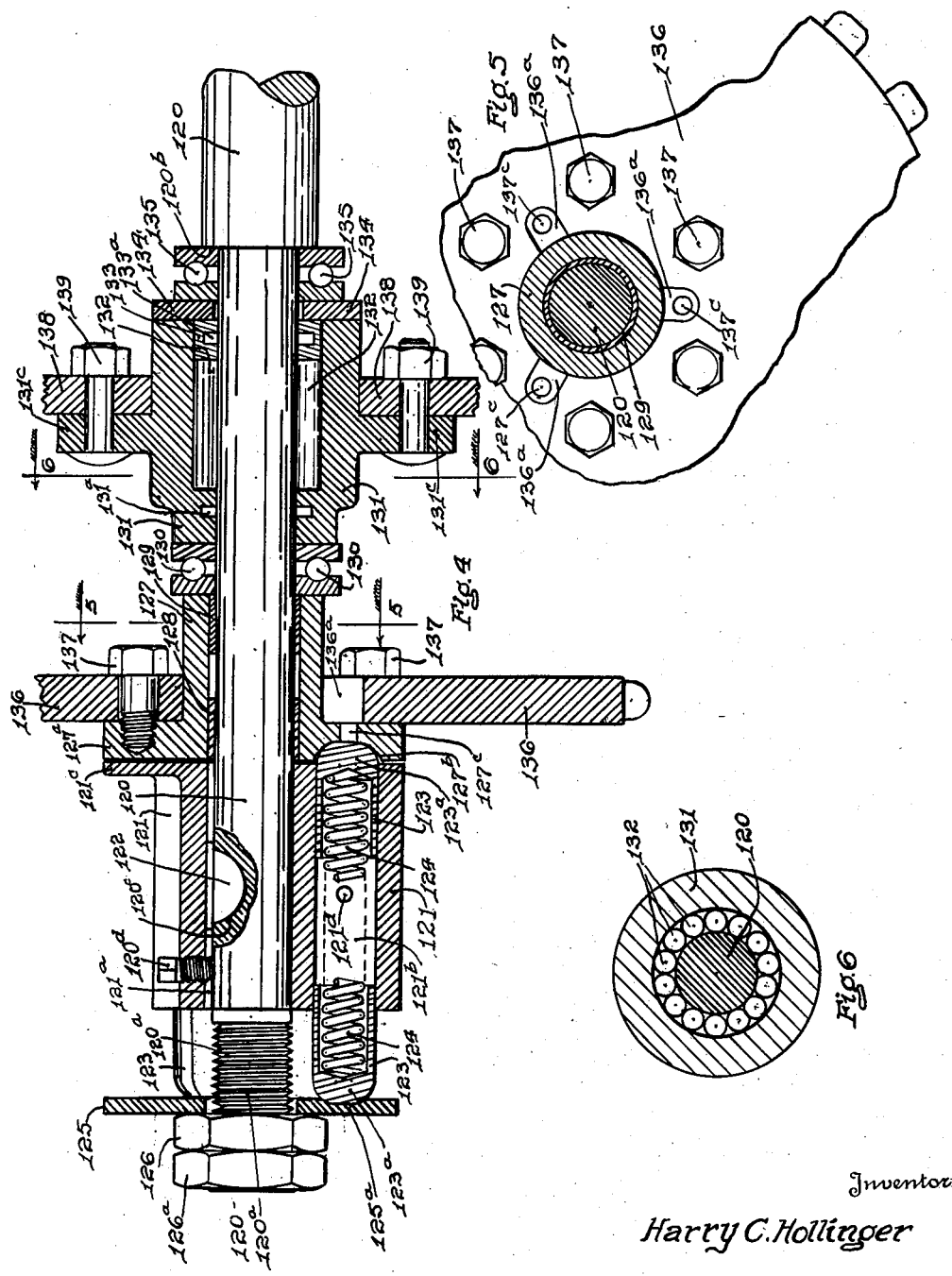
Inventor
Harry C. Hollinger
By Walter W. Burns
Attorney

Patented Mar. 17, 1953

2,631,444

UNITED STATES PATENT OFFICE 2,631,444

OVERLOAD CLUTCH

Harry C. Hollinger, York, Pa., assignor to A. B. Farquhar Company, York, Pa., a corporation of Pennsylvania Application August 7, 1947, Serial No. 767,040

1 Claim. (Cl. 64—29)

This invention relates to overload clutches and is particularly related to those overload clutches wherein resiliently pressed plungers retain the power transmission until the overload point in power is reached.

The primary object of this invention is the provision of an improved power transmitting overload clutch.

Another object of the invention is the provision of an overload clutch wherein during the normal operation, there is no unbalanced thrust against the power shaft or against the driven shaft or rotary member to which the power is driven.

Still another object of the invention is the provision of an improved overload clutch having a supporting member for carrying the clutch and in which there is no unbalanced thrust in either the direction of the driving or the direction of the driven member.

A still further object of the invention is the provision of an improved overload clutch wherein there are a plurality of resiliently pressed depression contacting members having a means for varying the resilient pressing action simultaneously while maintaining an equal pressing action during and after adjustment.

Another and still further object of the invention is the provision of an improved overload clutch wherein the drive and driven members are free from unbalanced thrust and wherein a slight increase toward overload is taken up without the clutch release taking place.

Other and further objects of the invention will be apparent to those skilled in the art from a reading of the complete specification and claim.

Referring to the drawings wherein are illustrated two modifications of the invention.

Fig. 1 is a longitudinal sectional view of the invention as applied to an axial transmission.

Fig. 2 is a sectional detail view taken on the line 2—2 of Fig. 1.

Fig. 3 is a sectional detail view taken on the line 3—3 of Fig. 1.

Fig. 4 is a longitudinal sectional view of a modified form of the invention showing a chain take-off at right angles to the power shaft.

Fig. 5 is a detail fragmental view taken on the line 5—5 of Fig. 4.

Fig. 6 is a detail sectional view taken on the line 6—6 of Fig. 4.

Similar reference characters refer to the same or similar parts throughout the specification and drawing.

Referring particularly to Fig. 1, the numeral 20 designates the drive shaft from which the power is derived. This shaft 20 has a threaded portion 20a which may be integral or may be in the form of a sleeve which is suitably brazed or welded to the shaft 20. A limiting collar 20b is provided to hold the parts in position as will be later made clear. This collar 20b is preferably rigid with the shaft 20 and may be integral therewith or a part of the sleeve 20a.

Surrounding the drive or power shaft 20 is the main body 21 of the overload clutch. This body member 21 is provided with a keyway 21a. The shaft 20 has a keyway slot in which is a woodruff key 22. This key extends into the slot 21a and prevents relative turning between the body member 21 and the shaft 20.

The body member 21 is provided with borings 21b which in the embodiment illustrated, are three in number. These borings are arranged with their axes parallel to the axis of the shaft 20 and each carries a pair of oppositely disposed spring-pressed plungers or pistons 23. These plungers or pistons 23 are hollow and are provided with rounded ends 23a. Each pair of plungers or pistons 23 has a spring 24, the ends of which are in the hollow portions of the pistons 23 and exert a pressure outwardly tending to move the pistons 23 of each pair away from each other.

Limiting the movement of the plungers or pistons 23 which are adjacent the threaded portions 20a is a contact plate 25 which is provided with hollows or depressions 25a. These depressions 25a are in position to receive and of a shape to fit the rounded ends 23a of the pistons 23. The contact plate 25 surrounds the threaded portions 20a and is held in position by the nut 26 which is threaded on the threaded portion 20a. By turning the nut 26 on its threaded portion 20a, it is obvious that the compression spring 24 may be made to give a varying pressure on the pistons 23. It is to be here noted that since the main body member 21 is keyed to the shaft 20 and since the pistons 23 and the contact member 25 and its nut 26 are all directly or indirectly carried by the shaft 20, there will be no tendency of the contact member 25 to turn relatively to the pistons 23 during operation.

Mounted on the shaft 20 and to turn relatively thereto is the complementary member 27 of the overload clutch. This complementary member 27 has depressions 27a similar to the depressions 25a in the contact members 25, except that these depressions are of a greater diameter than the coacting rounded ends 23a of the pistons 23 which coact therewith. The purpose of this construction with the difference in diameters will be later made clear.

Between the bore of the complementary member 27 and the shaft 20 are inner and outer bearing members 28 and 29.

The shaft 20 is provided with a smaller diameter section 20b, upon which is mounted a thrust bearing 30 which contacts the shoulder 20c of the shaft 20 and also the shoulder 27b of the complementary member 27. At the end of the shaft 20 beyond the smaller section 20b is a threaded end 20d on which is threaded a nut 31.

Extending from the complementary member 27 in the form of the invention illustrated, are a pair of arms 27c which form one part of the universal joint 32. A pair of arms 33a also connect the universal joint 32 to the driven shaft 33 which serves as a power take-off in the illustrated construction.

The operation of this form of the invention will now be described.

The power is delivered from the drive or power shaft 20 through key 22, the main body member 21, the clutch plungers or pistons 23 and the depressions 27a of the complementary member 27 to the universal joint 32 and to the driven shaft 33. It is here to be observed that during this transmission of power, there is a complete balance of thrust between the power shaft 20 and the driven shaft 33. This is caused by the thrust of the thrust bearing 30 against the complementary member 27 which in turn presses against the rounded portions 23a, the springs 24 and the contact plate or member 25. It is to be further noted that the main body 21 of the clutch member functions merely as a guide for the plungers or pistons 23, since the axial thrust is all carried by the pistons 23, the key 22 merely preventing relative turning between the shaft 20 and the main body member 21. The shoulder formed by the limiting collar 20b keeps the main body member 21 from slipping from its place on the shaft 20. If desired, a set screw similar to the part 120d of Fig. 4 may be used.

Whenever the torque on the driving shaft 20 as transmitted to the complementary member 27 through the ends of the plungers or pistons 23 becomes too great relative to the resistance to turning by the driven shaft 33, then there will be a tendency for the pistons 23 to ride up the sides of the depressions 27a. The fact that the depressions 27a have a slightly greater diameter than the rounded ends 23a of the pistons 23, may in the case of a slight increase above the normal transmitting maximum, cause a slight compression of the springs 24 without the necessity of the releasing action of the clutch to take place. However, a further resistance to the turning of the driven shaft 33, may be sufficient to cause the springs 24 to be compressed to a sufficient distance to cause the rounded ends 23a of the pistons 23 to ride over the edges of the depressions 27a and the clutch will release permitting the power shaft to continue to turn while the driven shaft 33 will be permitted to be retarded or even to stop entirely.

As soon as the obstruction which caused the resistance to the turning of the driven shaft 33 is removed sufficiently, the pistons 23 will again enter the depressions 27a and normal conditions of power transmission will be restored. To provide for proper lubrication, a lubrication plug 21c is provided for each boring or cylinder 21b. In order that when lubricant is forced into the borings or cylinders 21b it will be facilitated in its travel to the seat of the rounded ends 23a in their depressions 27a and to permit foreign substances to escape, an opening 27d is provided. The adjacent faces of the main body member 21 and the complementary member 27 are close enough together to permit bare clearance and may normally be filled with the lubricant from the cylinders or borings 21b.

In the modified form illustrated in Figs. 4, 5, and 6, there is illustrated a construction wherein the power may be taken off at right angles to the drive or power shaft by a chain or belt and wherein the overload clutch is supported by a wall. This construction will now be described.

The shaft 120 is provided at its outer end with a threaded portion 120a and at the inner end of the clutch with a shoulder 120b, the purposes of which will be presently made clear. In a keyway 120c is a woodruff key 122. Mounted on the shaft 120 is the main body 121 of the overload clutch. This main body portion 121 is provided with a keyway 121a to receive the upper edge of the woodruff key 122 to hold the main body portion 121 non-rotatively on the shaft 120.

The main body portion 121 is provided with borings or cylinders 121b—three in number in the form of the invention illustrated in Figs. 4, 5, and 6. These cylinders 121b are provided each with a pair of complementary plungers or pistons 123. These plungers are hollow and have rounded ends 123a for a purpose to be made clear. A spring 124 is provided and has a slightly less outer diameter than the insides of the plungers 123 so that the springs can be readily inserted in the ends of the plungers 123 as illustrated in Fig. 4.

Surrounding the shaft 120 is a contact plate or member 125 which is adjustable to vary the compression in the springs 123. The plate or contact member 125 is provided with depressions 125a in which the rounded ends 123a rest. A pair of lock nuts 126, 126a are provided on the threaded end 120a to hold the contact plate or member 125 in adjusted position.

Adjacent the flanged end 121c and mounted to rotate relative to the shaft 120, is the complementary member to the main body member 120. This complementary member I have designated 127. Between the complementary member 127 and the shaft 120 are suitable bearing members 128, 129. The complementary member 127 and the shaft 120 are free for relative movement except for the construction which will now be described.

In the flange 127a of the complementary member 127 are three equally spaced depressions 127b placed so as to register with the rounded ends 123a of the plungers or pistons 123. It is to be here noted that the diameters of the depressions 127b are slightly greater than the diameters of the rounded ends 123a. The purpose of this relative size will later be made clear. Openings 121d with suitable plugs therefor, are provided so that lubricants may be forced into the cylinders or borings 121b to provide lubrication for the plungers or pistons 123. Openings 127c are provided in the deep portions of the depressions 127a to assist the lubricant in the borings or cylinders 121b to enter the depressions 127a and to permit foreign particles to pass from between the rounded ends 123a of the pistons or plungers 123 and the bottoms of the depressions 127a.

At the inner end of the complementary member 127, there is a thrust bearing 130 which has one side in contact with the end of the complementary member 127 and with the bearing member 129. The other ring member of the bearing 130 is in contact with the bearing support housing 131. The shaft 120 passes through the bearing housing 131 and is journaled on the roller bearing members 132. The housing 131 is provided with a grease groove 131a.

To close the opening at the end of the space occupied by the bearing members 132, there is provided a grease washer 133 which has a grease groove 133a to provide the grease groove 131a, proper lubrication for the roller bearing members 132.

At the end of the opening through which the roller bearing members 132 are inserted and extending over the end of the grease washer 133 and the bearing housing 131 is a plate washer 134. A second thrust bearing 135 occupies the space between the plate washer 134 and the shoulder 120b of the shaft 120.

In order to take the power from the complementary member 127 there is provided a driven gear or pulley 136 which is secured to the complementary member 127 by the studs 137. Cut away portions 136a are provided in positions to register with the openings 127c to permit escape of foreign substances or excess lubricant.

In order to support the unit as a whole, the housing 131 is provided with a flange 131c which is secured to the support 138 by the bolts 139. The support 138 is here illustrated as a plate but any suitable support which is sufficiently rigid and through which the shaft 120 and its coacting parts may pass, may be used.

The operation of the form of the invention illustrated in Figs. 4, 5, and 6 will now be described.

Assuming the power to be applied to the shaft 120 and the latter rotating, the key 122 turns the main body member 121 of the clutch. As the plungers or pistons 123 are carried by the main body member 121, and the plungers or pistons 123 are seated in the depressions 127b of the complementary member 127 by the pressure of the springs 124 it follows that the turning of the shaft 120 will also in turn rotate the complementary member 127.

It is to be here noted that the parts are all in equilibrium when the power is being transmitted. The main body member 121 is held in place by the key 122 and the heavy set screws 121d with no tendency to move endwise. The plungers or pistons 123 are balanced each by the opposite one of its pair. One plunger or piston of a pair pushes on the plate 125 which plate 125 is adjustably held from axial movement relative to the shaft by the nuts 126 and 126a. The other piston or plunger 123 of a pair contacts the depression 127b of the complementary member 127 to cause the latter to turn. The thrust is taken up by the thrust bearing 130 which thrust is in turn transmitted to the thrust bearing 135. The gap between the flanges 127a and 121c is controlled by the thickness of the plate washer 134. Thus, all thrusts are taken up in the clutch itself with no thrusts being transmitted to the support member 138.

When the difference between the torque tending to turn the shaft 120 and the main body member 121 and the resistance of the pulley or gear 136 to turning, becomes great enough to force the plungers 123 against the springs 124, thus forcing the plungers or pistons 123 from their respective depressions 127b, the clutch will release by permitting relative rotation between the main body member 121 and the complementary member 127. In case the tendency to unseat the plungers or pistons 123 is very temporary and not sufficient to cause the plungers or pistons 123 to ride entirely out of their respective depressions 127b, the difference between the diameters of the plungers 123 and the depressions 127b will permit the plungers or pistons 123 to ride up on the inclined bottom of the depressions 127b. After the slight increase in the difference on the forces has ceased, the plungers or pistons will return to the bottoms of the respective depressions.

It is to be understood that the positions of the nuts 26, 126, 126a predetermine the overload and consequently the power conditions under which the respective plungers 23, 123 will release.

It is to be noted that the constructions of the illustrated forms of the invention are such that the driving power members are adapted to become the driven power members and the driven power members are adapted to become the driving power members.

While modifications of the invention have been illustrated and described in detail, it is to be understood that the disclosure is merely illustrative and that modifications, alterations, and changes may be made without departing from the spirit of the invention and within its scope as claimed.

Having described the invention, what is claimed is:

An overload clutch comprising a rotary driving power member, a rotary driven power member coaxial with the rotary driving power member, a main clutch member mounted on one of the rotary power members and keyed thereto for rotary non-axial movement therewith, a complementary clutch member mounted on the same rotary power member for rotary non-axial movement therewith, the clutch members being coaxial and having faces in close proximity to each other, a series of circumferentially and equally spaced elongated cylindrical openings in the main clutch member with axes parallel to the axis of the main clutch member, a pair of opposed cylindrical plungers in each cylindrical opening, a spring between the plungers of each pair tending to force the plungers away from each other, the plungers having rounded outer ends, the rotary power member carrying the main clutch member having a screw thread, an adjustment not on the thread, a contact plate between the nut and main clutch member and having contact places in position to receive the plunger ends, whereby the nut may, when adjusted along the thread, press the plungers against the springs causing the springs to press against the respective plungers at the opposite ends of their cylindrical openings, the complementary clutch member having spaced openings in its face which is adjacent to the main clutch member, and in positions to receive the rounded ends of adjacent plunger members, these openings in the complementary clutch member being of the general shape of the plunger ends but of substantially greater width than the ends of the plunger members.

HARRY C. HOLLINGER.

REFERENCES CITED

The following references are of record in the file of this patent:

UNITED STATES PATENTS

| Number | Name | Date |
|---|---|---|
| 1,141,461 | Hazelton | June 1, 1915 |
| 1,672,964 | Stull | June 12, 1928 |
| 2,157,574 | Siesel | May 9, 1939 |
| 2,164,870 | De Salardi | July 4, 1939 |
| 2,291,407 | Paul | July 28, 1942 |
| 2,292,759 | Johnson | Aug. 11, 1942 |
| 2,333,553 | Potgieter et al. | Nov. 2, 1943 |
| 2,390,908 | Young | Dec. 11, 1945 |